(12) United States Patent
Jha

(10) Patent No.: US 10,621,438 B2
(45) Date of Patent: Apr. 14, 2020

(54) HYBRID HYPERSPECTRAL AUGMENTED REALITY DEVICE

(71) Applicant: Syso OU, Saku (EE)

(72) Inventor: Diwaker Jha, Saku (EE)

(73) Assignee: SYSO OU, Saku (EE)

( * ) Notice: Subject to any disclaimer, the term of this patent is extended or adjusted under 35 U.S.C. 154(b) by 0 days.

(21) Appl. No.: 15/948,269

(22) Filed: Apr. 9, 2018

(65) Prior Publication Data

US 2019/0073536 A1    Mar. 7, 2019

Related U.S. Application Data

(60) Provisional application No. 62/555,260, filed on Sep. 7, 2017.

(51) Int. Cl.
| | |
|---|---|
| *G06K 9/00* | (2006.01) |
| *H04N 5/33* | (2006.01) |
| *G02B 27/01* | (2006.01) |
| *G06T 11/60* | (2006.01) |
| *H04N 5/374* | (2011.01) |
| *G06K 9/20* | (2006.01) |
| *G06T 11/00* | (2006.01) |
| *G08B 21/02* | (2006.01) |

(52) U.S. Cl.
CPC ..... *G06K 9/00671* (2013.01); *G02B 27/0172* (2013.01); *G06K 9/2018* (2013.01); *G06T 11/00* (2013.01); *G06T 11/60* (2013.01); *H04N 5/33* (2013.01); *H04N 5/374* (2013.01); *G02B 2027/014* (2013.01); *G02B 2027/0138* (2013.01); *G08B 21/02* (2013.01)

(58) Field of Classification Search
CPC .......................... G06K 9/00671; H04N 5/332
See application file for complete search history.

(56) References Cited

U.S. PATENT DOCUMENTS

| | | | | |
|---|---|---|---|---|
| 2009/0015686 | A1* | 1/2009 | Alsberg | G01J 3/02 |
| | | | | 348/222.1 |
| 2014/0062772 | A1* | 3/2014 | Jasiobedzki | G01S 17/023 |
| | | | | 342/357.28 |
| 2016/0184703 | A1* | 6/2016 | Brav | G06F 3/012 |
| | | | | 463/30 |

(Continued)

*Primary Examiner* — Yi Yang
(74) *Attorney, Agent, or Firm* — Jacob Eisenberg

(57) ABSTRACT

A hybrid hyperspectral augmented reality device is disclosed. The hybrid hyperspectral augmented reality device includes multi-level imaging sensors which at least two of a long wave infrared sensor capable of detecting an object blocked from visual line of sight thereof, a hyperspectral imaging sensor capable of detecting chemical properties of the object, and a frequency modulated millimeter-wave imaging radar capable of long range spot scanning of the object. The hyperspectral imaging augmented reality device also includes a wearable computing unit capable of co-registering data from the multi-level spectral imaging sensors and determining, based on said co-registered data, a threat level and geospatial location for the object. The hybrid hyperspectral augmented reality device further includes a portable display in electronic communication with the wearable computing unit and capable of displaying in augmented reality the determined threat levels for the object together in graphical association with the objects themselves.

18 Claims, 4 Drawing Sheets

(56) References Cited

U.S. PATENT DOCUMENTS

2016/0248995 A1* 8/2016 Mullins .................. H04N 7/185
2016/0375669 A1* 12/2016 Gibson ............... B32B 37/1009
                                                                156/105

* cited by examiner

HYBRID HYPERSPECTRAL AUGMENTED REALITY DEVICE

FIELD OF THE PRESENT DISCLOSURE

The present disclosure generally relates to hyperspectral imaging technologies, and more particularly relates to a wearable hybrid hyperspectral augmented reality device.

BACKGROUND

Many times, for example, in a military or civilian security operations, it is required to detect and visualize hidden adversaries in jungles and desert or life hazards such as chemical and bacterial contamination hot spots, adsorbed or intruded foreign objects that are covered, e.g. shrapnel under a wounded soldier's skin while out in a field operation. Diagnostic equipment, such as, X-ray and ultrasound scanners which are often used to visualize foreign objects (e.g., inside the human skin) are usually heavy and expensive. For instance, conventional X-ray scanners are large, power hungry and often require special operating conditions that may not be feasible to provide in the field operation. Further, in case of conventional ultrasound scanner, a transducer for ultrasound is pressed into the region of injury with coupling fluid, which may be cumbersome to carry out in the in the field operation, and is also invasive and painful. Such military operations may also, sometimes, require to detect toxic chemicals and other airborne hazards. Tabletop spectrometer with swabs can accurately detect chemical hazards but they require meticulous steps and can be heavy to carry around for on foot patrols and street policing operations. Besides military and civilian safety applications, monitoring healthy edible inventory, production facilities, airports, surveying disaster zones, geological explorations for research, minerals or fossil fuel relies largely on time consuming bulky devices, which often requires additional offline data processing to retrieve actionable information.

Hyperspectral imaging is rapidly gaining market in medical imaging and chemical anomaly detection. Some cameras employ hyperspectral (or multispectral) imaging to capture many optical bands within and outside of the visible spectrum. Such hyperspectral imaging devices can be implemented to detect camouflaged object with a high degree of confidence in a crowded environment such as battlefield, concert area, sports arena, airports, processions, and protests. Further, such devices are capable of distinguishing chemical, biological, radiological and nuclear (CBRN) materials present or planted in civilian, as well as in a battlefield setting. However, standard hyperspectral imaging systems might weigh several kilos and require dedicated computational post-processing steps to retrieve actionable information. That is, these hyperspectral imaging devices are usually large, heavy camera type devices that are typically designed to be mounted on a survey or reconnaissance aircraft or fixed on a scanning frame above conveyor belts in food processing industry. Furthermore, these hyperspectral camera systems are costly and cumbersome, and require a specialist to calibrate, set parameters and finally retrieve actionable information in post processing.

Accordingly, there is a need of a portable imaging device which can be implemented to distinguish chemical, biological, radiological and nuclear (CBRN) materials present or planted, for example, in a battlefield or in a civilian setting, or the like. In particular, there is a need of a wearable hybrid device that can directly visualize camouflaged adversaries in jungles, deserts and snow or weapons under opaque layer of clothing upon close contact. Similarly, in case of medical emergency in field, evaluate conditions, such as, state of shock, nature of open wounds, identify chemical deposits on the skin or a couple of layers inside the wound and also detect foreign objects, such as shrapnel inside a wounded soldier's skin.

SUMMARY

In one aspect, the hybrid hyperspectral augmented reality device is disclosed. The hybrid hyperspectral augmented reality device includes multi-level imaging sensors. The multi-level imaging sensors include at least two of: a long wave infrared sensor capable of detecting an object blocked from visual line of sight thereof, a hyperspectral imaging sensor capable of detecting chemical properties of the object, and a frequency modulated millimeter-wave/Terahertz imaging radar capable of long range spot scanning of the object. The hybrid hyperspectral augmented reality device also includes a wearable computing unit capable of co-registering data from the multi-level spectral imaging sensors and determining, based on said co-registered data, a threat level and geospatial location for the object. The hybrid hyperspectral augmented reality device further includes a portable display in electronic communication with the wearable computing unit and capable of displaying in augmented reality the determined threat levels for the object together in graphical association thereof.

In one or more embodiments, the hybrid hyperspectral augmented reality device further may include an RGB camera to capture an image of the object. The computing unit is capable of spatially co-registering image from the camera with data from the multi-level spectral imaging sensors. Further, the portable display is capable of overlaying the threat data on the image from the camera in the same field of view.

In one or more embodiments, the portable display projects or otherwise displays threat information to a user as without the use of overlaying information on an image taken from a camera.

In one or more embodiments, the portable display is a head mounted display.

In one or more embodiments, the hybrid hyperspectral augmented reality device further includes a spatial tracking device located on the head mounted display to track at least the orientation of the head mounted display. The wearable computing unit is further arranged to co-locate the threat information and geospatial location information for an associated object with the field of view of the head mounted display.

In one or more embodiments, the determination of threat level is self-contained within the wearable computing unit.

In one or more embodiments, the multi-level spectral imaging sensors include tunable wavelength filters that allow transmission of electromagnetic spectrum of wavelength ranging in between 0.35 to 2.6 µm.

In one or more embodiments, the tunable wavelength filter is arranged in front of a complementary metal-oxide semiconductor (CMOS) image sensor.

In one or more embodiments, the tunable wavelength filter is arranged at the beam waist inside the objective lens assembly.

In one or more embodiments, the computing unit is connected to the tunable wavelength filter and being capable of synchronizing a transmission wavelength from the tunable wavelength filter and a wavelength label on data from an associated multi-level spectral imaging sensor.

In one or more embodiments, the tunable wavelength filter is MEMS based device.

In one or more embodiments, the multi-level spectral imaging sensors include a single lens capable of focusing an input light beam onto a beam splitting optics, said beam splitting optics capable of splitting the input light beam into two separate beams with each beam focused on a separate tunable wavelength filter placed in front of the CMOS image sensor.

In one or more embodiments, the two or more separate tunable wavelength filters in order to do hyperspectral imaging is arranged in an array.

In one or more embodiments, the two or more separate tunable wavelength filters forming a hyperspectral imaging system are arranged in an array along with beam splitting configuration.

In one or more embodiments, the two or more separate tunable wavelength filters have a different spectral range.

In one or more embodiments, the two or more separate tunable wavelength filters have a partially overlapping spectral range.

In one or more embodiments, one of the separate tunable wavelength filters has a range between 350-550 nm, the second of the separate tunable wavelength filters has a range between 500-1100 nm and the additional of the separate tunable wavelength filters has a range between but not limited to 1100-2600 nm.

In one or more embodiments, a data transmission means for sending sensor and/or determined threat data to a remote device, secure or open cloud storage, and/or ground control base.

In one or more embodiments, the wearable computing unit is capable of retrieving and displaying additional information to a user based on the determined threat.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments.

The embodiments are described herein for illustrative purposes and are subject to many variations. It is understood that various omissions and substitutions of equivalents are contemplated as circumstances may suggest or render expedient, but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Figure 1:
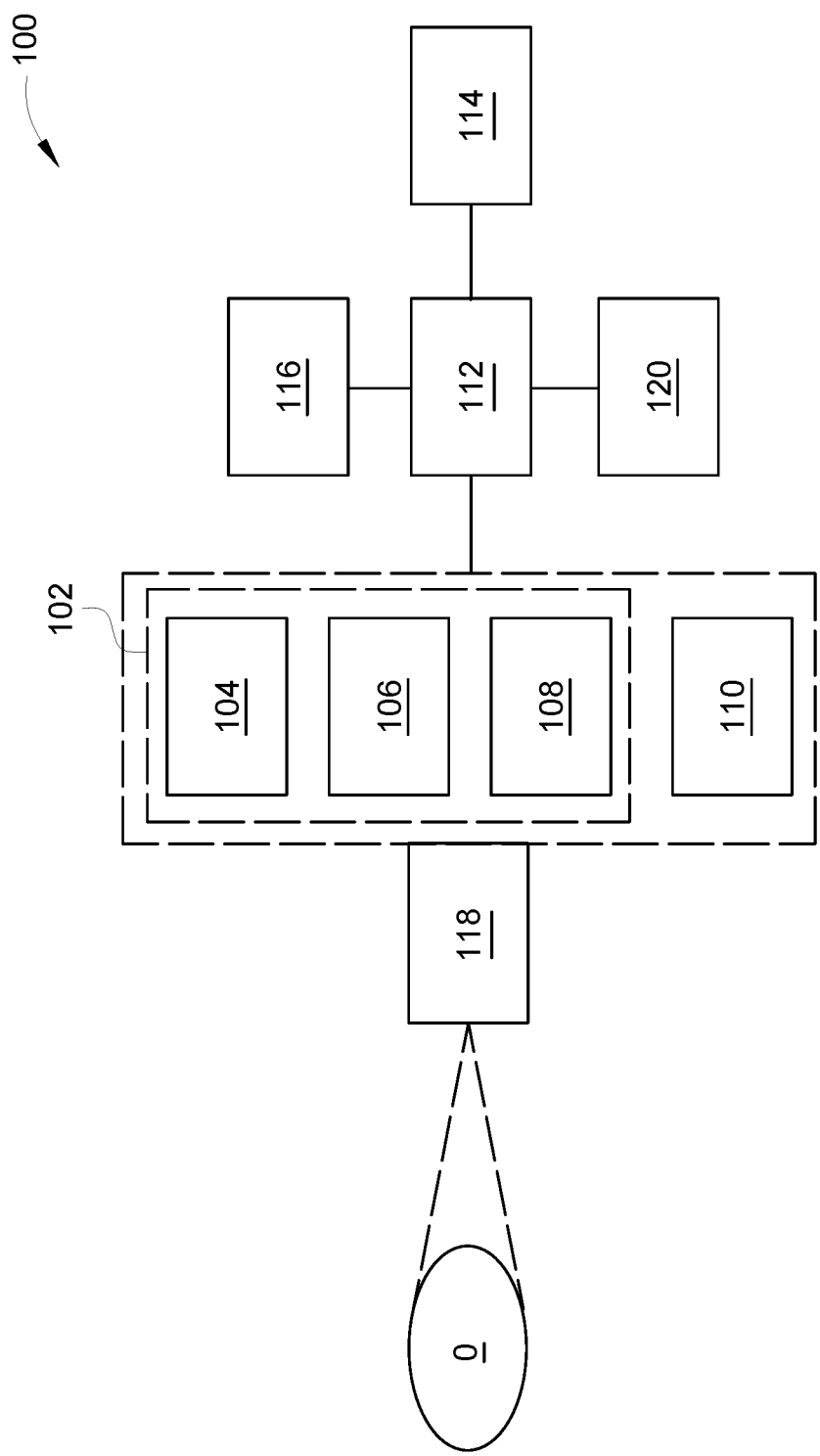
FIG. 1 illustrates a schematic block diagram of a hybrid hyperspectral augmented reality device, in accordance with one or more embodiments of the present disclosure.

Referring to the drawings, FIG. 1 illustrates a block diagram of an imaging device (generally designated by the numeral 100) showing an arrangement of various components therein, in accordance with an embodiment of the present disclosure. In one or more embodiments, the imaging device 100 is, and has been interchangeably referred to as, a hybrid hyperspectral augmented reality device. The hybrid hyperspectral augmented reality device 100 of the present disclosure is a wearable hybrid device which can directly visualize conditions, such as, state of shock of a human, nature of open wounds, identify chemical deposits on the skin or inside the wound and also detect foreign objects, such as shrapnel inside a wounded soldier's skin. The hybrid hyperspectral augmented reality device 100 allows for a user to seamlessly change mode in operation software from detection of objects to remotely detect and visualize toxic chemicals and airborne hazards in real-time. Further, the hybrid hyperspectral augmented reality device 100 enables to directly visualize actionable information and maps retrieved from multi-level detection by deploying an augmented reality engine. Further details about the present hybrid hyperspectral augmented reality device 100 have been described in terms of its components as discussed in reference to the drawings in the subsequent paragraphs.

The imaging device 100 includes one or more imaging sensors (generally depicted by numeral 102). In present embodiments, the imaging sensors 102 are multi-level spectral imaging sensors which provides multi-level spectral imaging ranging from ultraviolet (UV) to long-wave infrared (LWIR) and beyond to map foreign objects with their estimated chemical identities. The multi-level spectral imaging sensors 102 are a powerful tool for non-contact or remote sensing of chemical information to determine material quality and composition. The multi-level spectral imaging sensors 102 combines taking pictures of a scene or object, with a spectral view at each point of resolution in the scene. The result is a three-dimensional data set that can be sliced to view multiple images at separate wavelengths, or sliced to show how the spectra vary along different spatial positions across the image in one direction. According to an embodiment, the multi-level spectral imaging sensors 102 include an array of different types of imaging sensors to cater to different spectra for imaging an object (generally labeled as 'O' in FIG. 1).

In an embodiment, the multi-level spectral imaging sensors 102 include a long wave infrared sensor 104 capable of detecting the object 'O', such as some object blocked from visual line of sight of the imaging device 100. For instance, the long wave infrared sensor 104 may take images of foreign objects lying several millimeters deep inside a wound in the human skin. Therefore, the long wave infrared sensor 104 may be able to detect object, such as, a shrapnel, which may even have penetrated into the skin of the human, for example, a soldier in a battlefield. Long wave infrared light sensors 104, unlike traditional visible cameras, use heat rather than light to see an object. As known, humans, animals, and vehicles are very hot in contrast to most backgrounds making trespassers hiding in shadows or bushes easy to spot. Thermal images are also unaffected by bright light and have the ability to see through atmospheric obstructions such as smoke, dust, and light fog. Thus, in addition to detecting the object blocked from visual line of sight, the long wave infrared sensor 104 also finds a number of applications, including but not limited to surveillance and security, search and rescue, fire, marine and land navigation, and wide area situational assessment.

In another embodiment, the multi-level spectral imaging sensors 102 include a hyperspectral imaging sensor 106 capable of detecting chemical properties of the object 'O'. The hyperspectral imaging sensor 106 is configured to capture data in many, often contiguous wavelength bands to obtain the spectrum for each pixel in the image of a scene, with the purpose of finding objects, identifying materials, or detecting processes. The advantage of hyperspectral imaging is that, because an entire spectrum is acquired at each point, the operator needs no prior knowledge of the sample, and post-processing allows all available information from the dataset to be mined. Hyperspectral imaging can also take advantage of the spatial relationships among the different spectra in a neighborhood, allowing more elaborate spectral-spatial models for a more accurate segmentation and classification of the image.

In yet another embodiment, the multi-level spectral imaging sensors 102 include a frequency modulated millimeter-wave radar 108 capable of long range spot scanning of the object 'O'. The miniaturized frequency modulated millimeter-wave imaging radar 108 working in tandem with the imaging part enables to estimate toxic chemicals and other health hazards at longer distances. Millimeter wave imaging radars can provide analytical data points across fog, smoke and other obscurants, where infrared sensors fall short. Therefore, compared to other means of detecting obstacles (LIDAR, cameras, standard hyperspectral imager etc.), the frequency modulated millimeter-wave imaging radar 108 is relatively unaffected by rain, fog, or backlighting, which makes it particularly suitable for low-visibility nighttime and bad weather. Frequency modulated millimeter-wave imaging radar 108 provides an added confidence level to the hybrid hyperspectral augmented reality device in adverse lighting and weather situations. In addition, controlling the frequency modulated millimeter-wave radar 108 allows for wide-angle detection. Such frequency modulated millimeter-wave radars 108 are employed in a wide range of commercial, military and scientific applications for high resolution mid range remote sensing, safety, and measurements, and are generally superior to microwave and infrared-based sensors in most applications.

In one or more embodiments, the multi-level spectral imaging sensors 102 may include at least one of the long wave infrared sensors 104, the hyperspectral imaging sensor 106 and the frequency modulated millimeter-wave radar 108, for the imaging device 100. In a preferred embodiment, the multi-level spectral imaging sensors 102 include at least two of the long wave infrared sensor 104, the hyperspectral imaging sensor 106 and the frequency modulated millimeter-wave radar 108, for the imaging device 100. In most preferred embodiment, the multi-level spectral imaging sensors 102 may include all three of the long wave infrared sensor 104, the hyperspectral imaging sensor 106 and the frequency modulated millimeter-wave radar 108, for the imaging device 100 without any limitations. Further, in an embodiment, the imaging device 100 also includes a camera 110 configured to take images of the object 'O' in visual line of sight of the multi-level spectral imaging sensors 102. It may be contemplated that the camera 110 may be a regular camera capable of capturing images in the visible spectrum.

The multi-level spectral imaging sensors 102 being a hybrid of the long wave infrared sensor 104, the hyperspectral imaging sensor 106 and the frequency modulated millimeter-wave radar 108 allows for detecting, measuring and visualizing the object 'O' in varying desirable manners to implement the imaging device 100 for multiple use-case scenarios. In the present examples, miniaturized versions of the long wave infrared sensor 104, the hyperspectral imaging sensor 106 and the frequency modulated millimeter-wave radar 108 as manufactured from recent advances in micro-structuring processes are utilized to keep the imaging device 100 compact and portable. Further, the frequencies of the electro-magnetic spectrum being utilized by any one of the long wave infrared sensor 104, the hyperspectral imaging sensor 106 and the frequency modulated millimeter-wave radar 108 is either free from any regulation or are free to use. Further, the utilized frequencies are non-destructive to avoid any damage to the imaged objects and non-ionizing to prevent any negative health affects to the living being imaged.

Further, as illustrated in FIG. 1, the imaging device 100 also includes a computing unit 112 capable of co-registering data from the multi-level spectral imaging sensors 102 and determining, based on said co-registered data, a threat level and geospatial location for the object 'O'. As may be contemplated, the chemical identity of a material can reveal its hazardous nature and magnitude. By measuring such properties of the object 'O' using the multi-level spectral imaging sensors 102, the computing unit 112 may be able to estimate the threat level of the object "O'. Further, the computing unit 112 is capable of spatially co-registering images from the camera 110 with data from the multi-level spectral imaging sensors 102. In one or more embodiments, the computing unit 112 is a wearable computing unit. For this purpose, the computing unit 112 may be miniaturized and made contact, such as, a mobile processor or the like. The computing unit 112 may basically be a computing board that runs control and analysis software either locally or on a remote server. In the present examples, the computing unit 112 may have enough computing power to carry out the analysis so that the determination of threat level is self-contained within the wearable computing unit 112 of the imaging device 100.

Figure 3:
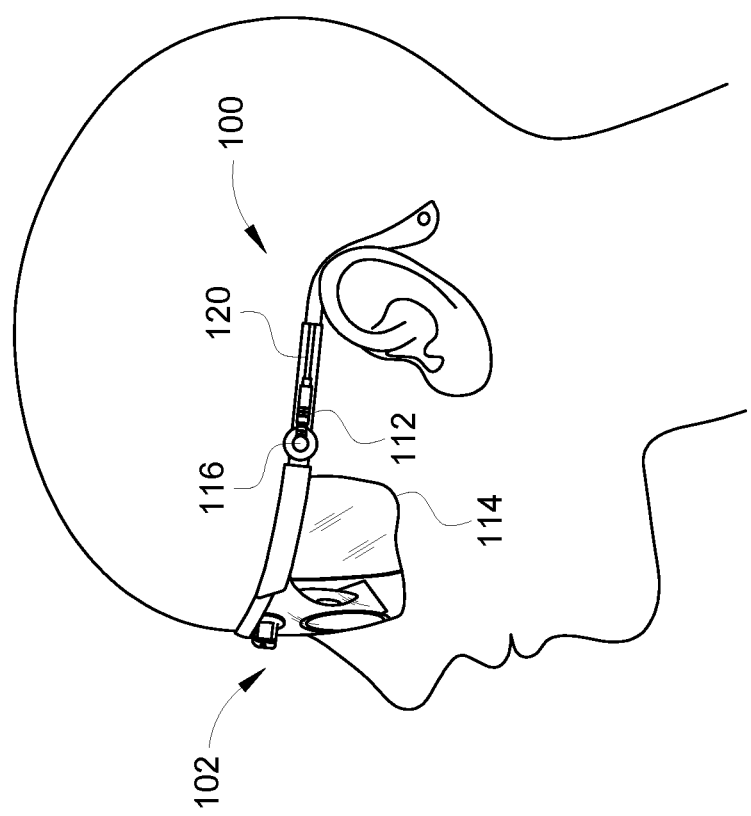
FIG. 3 illustrates a diagrammatic view of the hybrid hyperspectral augmented reality device of FIG. 1 being implemented as a head mounted display, in accordance with one or more embodiments of the present disclosure.

In an embodiment, the imaging device 100 also includes a portable display 114 in electronic communication with the wearable computing unit 112. The portable display 114 is capable of displaying in augmented reality the determined threat levels for the object 'O' together in graphical association with the object 'O' itself. The portable display 114 is further capable of overlaying the threat data on the image from the camera 110 or overlay the threat data directly on to the field of view of the user. According to an embodiment, as illustrated in FIG. 3, the portable display 114 is a head mounted display. Such head mounted displays for displaying augmented reality (AR) content images or video feed are well known in the art. Such head mounted portable display 114 may project images with a projector onto at least one lens thereof. The said projector may be one of, for example, a nano-projector, pico-projector, micro-projector, femto-projector, LASER-based projector, holographic projector and lenses, see through optics based display comprised of technology such as polarized beam combiner, semi spherical combiner, waveguide hologram and the like which may be disposed in a frame portion of the portable display 114. In some examples, more than one projector may be included in the portable display 114. Further, in one or more examples, both the lenses of the portable display 114 may be see-through or translucent, while in other embodiments only one lens may be translucent while the other may be opaque or missing. Further, it may be understood that other components of the imaging device 100, including the multi-level spectral imaging sensors 102, the computing unit 112, etc. may be disposed in the said head mounted display itself.

In an embodiment, a digital signal processor (DSP) may be programmed and/or configured to receive video feed information and configure the video feed to drive whatever type of image source is being used with the portable display 114. The DSP may include a bus or other communication mechanism for communicating information, and an internal processor coupled with the bus for processing the information. The DSP may include a memory, such as a random access memory (RAM) or other dynamic storage device (e.g., dynamic RAM (DRAM), static RAM (SRAM), and synchronous DRAM (SDRAM)), coupled to the bus for storing information and instructions to be executed. The DSP can include a non-volatile memory such as for example a read only memory (ROM) or other static storage device (e.g., programmable ROM (PROM), erasable PROM (EPROM), and electrically erasable PROM (EEPROM)) coupled to the bus for storing static information and instructions for the internal processor. The DSP may include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The DSP may include at least one computer readable medium or memory for holding instructions programmed and for containing data structures, tables, records, or other data necessary to drive the optical display. Examples of computer readable media suitable for applications of the present disclosure may be compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read. Various forms of computer readable media may be involved in carrying out one or more sequences of one or more instructions to the portable display 114 for execution. The DSP may also include a communication interface to provide a data communication coupling to a network link that can be connected to, for example, a local area network (LAN), or to another communications network such as the Internet. Wireless links may also be implemented. In any such implementation, an appropriate communication interface can send and receive electrical, electromagnetic or optical signals that carry digital data streams representing various types of information to the portable display 114.

Figure 4:
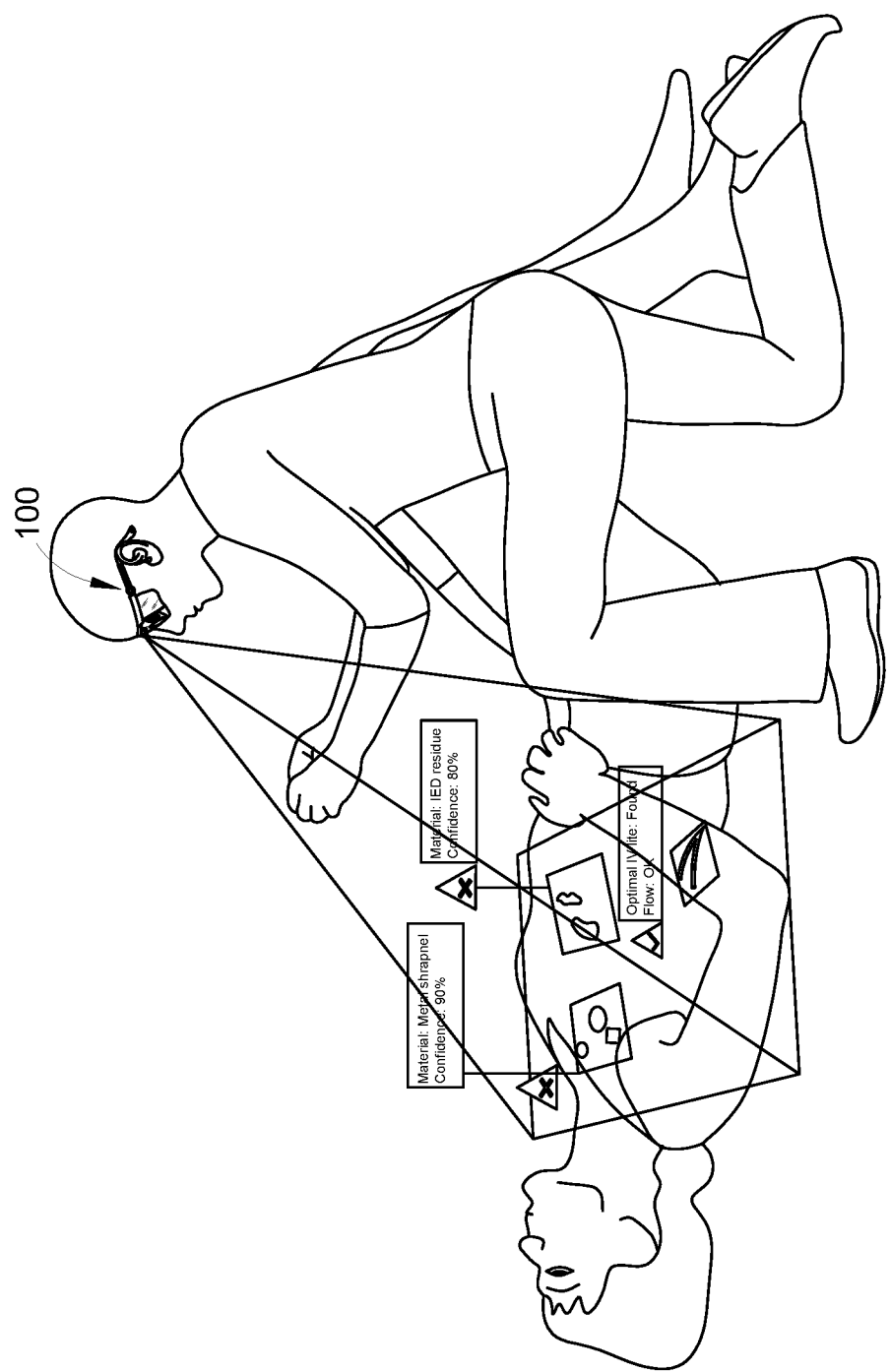
FIG. 4 illustrates a depiction in which the hybrid hyperspectral augmented reality device of FIG. 1 is being implemented in an operation, in accordance with one or more embodiments of the present disclosure.

As noted earlier, the portable display 114 is capable of displaying, in augmented reality, the determined threat levels for the object 'O' together in graphical association therewith, while overlaying the threat data on the image from the camera 110. For augmented reality (AR) display, the detected region and the corresponding material location can be co-registered. This can be achieved by compensating for the projection distance or object depth. The depth can be obtained by a laser ranging system or calculated by a known method of triangle similarity. In some examples, the portable display 114 may project or otherwise displays threat information to a user as without the use of overlaying information on the image taken from the camera 110. The imaging device 100 displays the status of the object 'O' in a user's field of view. As discussed, the multi-level spectral imaging sensors 102 can be implemented for distinguishing and classifying materials in the imaging device 100 as the status of the object 'O'. Such status information can be overlaid as a color coded intensity map with relevant information using augmented reality by the portable display 114 (as depicted in the illustration of FIG. 4).

In one or more embodiments, the imaging device 100 further includes a spatial tracking device 116 located on the head mounted display 114 to track at least the orientation of the head mounted display 114. It may be contemplated by a person skilled in the art that by using the data from the spatial tracking device 116, the wearable computing unit 112 can further be configured to co-locate the threat level information and geospatial location information for the object 'O' with the field of view of the head mounted display 114, in the imaging device 100. It may be understood that a power source (not shown), such as a portable battery may be utilized in the imaging device 100 to power the various electronic components thereof.

In one or more embodiments, the imaging device 100 include a tunable wavelength filter 118. In an embodiment, the tunable wavelength filter 118 is a MEMS device. The tunable wavelength filter 118 are optical filters that use electronically controlled liquid crystal (LC) elements to transmit a selectable wavelength of light and exclude others. In the present embodiments, the tunable wavelength filter 118 may be configured to filter light spectrum between 0.35 to 2.6 μm. In one or more examples, for a wide band sensing and improved detection, a beam splitter can be added to the system. The beam splitter may be positioned on an optical axis with an objective lens. The frequency filters can then be positioned after the splitter and before the sensor(s). Additionally, multiple lenses with different associated frequency filters can be arranged in place of, or in addition to a beam splitter. For wide band sensing, at least two different frequency filters are used with different frequency bands. There can be more than two of the multiple frequency filters. The multiple frequency filters can have independent or overlapping ranges.

Figure 2A:
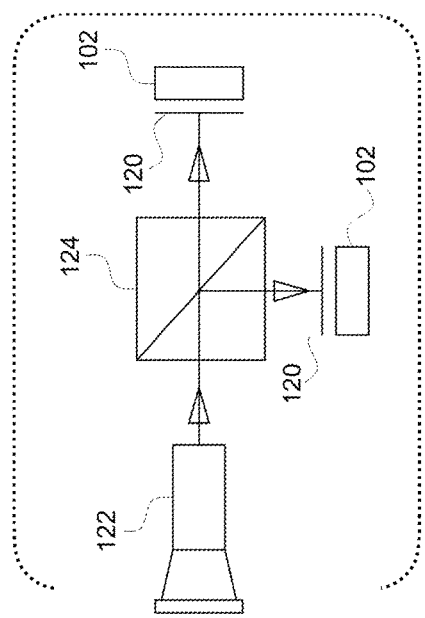
FIG. 2A illustrates a schematic view of a tunable wavelength filter disposed with multi-level spectral imaging sensors in the hybrid hyperspectral augmented reality device, in accordance with one or more embodiments of the present disclosure.
Figure 2B:
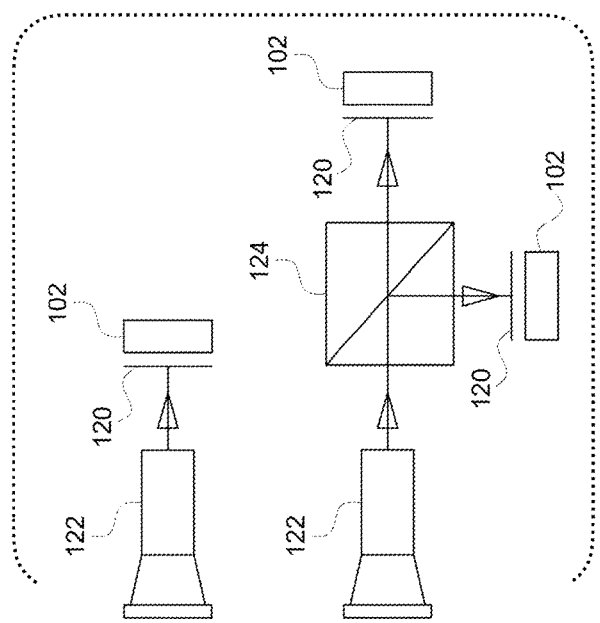
FIG. 2B illustrates a schematic view of two separate tunable wavelength filter disposed with multi-level spectral imaging sensors in the hybrid hyperspectral augmented reality device, in accordance with one or more embodiments of the present disclosure.
Figure 2C:
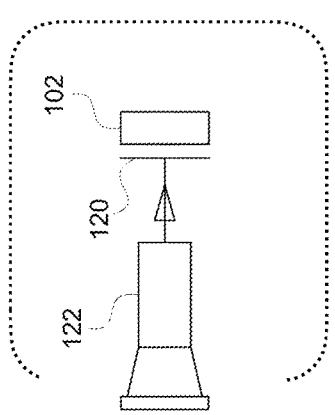
FIG. 2C schematic view of two but not limited to two separate tunable wavelength filter of different ranges are arranged in an array form disposed with imaging sensors and/or long wave infrared sensor, and/or terahertz imaging radar aiding the hybrid hyperspectral augmented reality device, in accordance with one or more embodiments of the present disclosure.
Figure 2D:
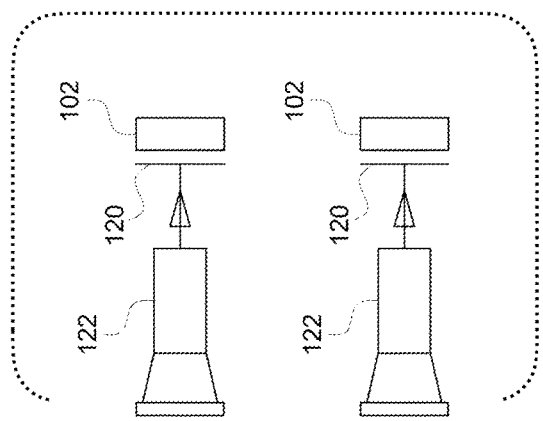
FIG. 2D schematic view of three but not limited to three separate tunable wavelength filter of different ranges arranged in an array form disposed with imaging sensors, and/or long wave infrared sensor, and/or terahertz imaging radar in the beam splitting as well as direct imaging configuration aiding the hybrid hyperspectral augmented reality device, in accordance with one or more embodiments of the present disclosure.

As illustrated in FIG. 2A, the tunable wavelength filter 118 may be arranged in front of a complementary metal-oxide semiconductor (CMOS) image sensor 120 of the multi-level spectral imaging sensors 102 and further utilizes a single lens 122 capable of focusing an input light beam thereon. In an alternate embodiment, as illustrated in FIG. 2B, the imaging device 100 may include two separate tunable wavelength filters 118. For this purpose, as illustrated in FIG. 2B, the multi-level spectral imaging sensors 102 may include a beam splitting prism 124 capable of splitting the input light beam (from the lens 122) into two separate beams with each beam focused on a separate tunable wavelength filter 118 placed in front of the corresponding CMOS image sensor 120. In an embodiment, the two separate tunable wavelength filters 118 may have a different spectral range. Further, the two separate tunable wavelength filters 118 may have a partially overlapping spectral range. For example, one of the separate tunable wavelength filters 118 has a range between 350-550 nm, and the second of the separate tunable wavelength filters 118 has a range between 500-1100 nm, additional separate tunable wavelength filters 118 has a range between 1100 to 1800 nm or the spectral range of 350 to 2600 nm shared between a number of tunable wavelength filters as shown in FIG. 2.

Further, as illustrated in FIG. 1, the computing unit 112 is connected to the tunable wavelength filter(s) 118. The computing unit 112 is capable of synchronizing a transmission wavelength from the tunable wavelength filter(s) 118 and a wavelength label on data from an associated multi-level spectral imaging sensors 102. That is, the computing unit 112 can be configured to tune one or more filters 118 to allow a predefined band (wavelength) of light to fall on the CMOS image sensor 120, in the imaging device 100. The wavelength label is utilized to identify the given wavelength being allowed through the tunable wavelength filter(s) 118 at any instant of time, and is associated as a meta-data tag or the like along with the corresponding spectral data from the multi-level spectral imaging sensors 102. Images or other sensor data can be saved uniquely with a corresponding label of the band or wavelength. Therefrom, the computing unit 112 can computationally identify the anomalies, such as camouflage, estimate chemical composition, biological, radiological, nuclear, explosive (CBRNE) materials in the field of view.

In one or more embodiments, the imaging device 100 also includes a data transmission unit 126 for sending sensor and/or determined threat data to a remote device (not shown). In the imaging device 100, the computing unit 112 is capable of retrieving and displaying additional information to a user based on the determined threat level, as received via the data transmission unit 126. The data transmission unit 126 may implement any wired or wireless means for transmission of the said data. The wireless means may include cellular, BLUETOOTH, Wi-Fi, Worldwide Interoperability for Microwave Access (WiMAX), an infrared channel or satellite bands or other wireless networking technologies as would be understood by one of ordinary skill in the art. The wireless links may also include any cellular network standards used to communicate among mobile devices, including standards that qualify as 1G, 2G, 3G, 4G, 5G, LTE or the like. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

In some examples, the computing unit 112 also implements a trigger signal that sets the filter's transmission frequency as defined by control software of the imaging device 100. The imaging device 100 may include a local or a cloud storage device in association with the computing unit 112 and which operates synchronous to the trigger so as to log 2D spectral images (x-y plane) as the function of frequencies (z-plane) forming a stack. The computing unit 112 can employ one or more algorithms that can cross processes spectral images in a stack to maximize normalized variation regions in them. This can be followed by a segmentation algorithm, which highlights materials of interest in the field of view. The computing unit 112 may then configure the portable display 114 for bordering pixels of segmented regions may determine the area that highlights the material of interest in the field of view. The segmented and highlighted part can be passed on to the portable display 114 with distance of projection compensated for real distance, thus directly visualizing the detected anomalies. This can be seen in the depiction of FIG. 4.

According to certain embodiments, the computing unit 112 does not directly display an image obtained at each frequencies f but logs them as a hypercube, where a 2D image, I is (x, y-plane) is logged for each frequency, fin a z-plane forming a stack. The computing unit 112 can then cross process images, If1, If2, If2 . . . Ifn in the stack to maximize the normalized variation in the reflected spectral intensities. This can be followed by a segmentation algorithm, which can highlight a material of interest. The bordering pixels of a segmented region can indicate the area that highlights the material of interest in the field of view. This can further be supplemented with its status, magnitude, class of the detected material with confidence level and geographical information. This can then be overlaid directly over the material in the field of view of the camera 110, for example in near real time or in real time.

According to certain embodiments, the computing unit 112 supplements the detected material confidence level from long wave infrared sensor and frequency modulated millimeter-wave imaging radar to support the computational model and data segmentation to estimate material identity in adverse lighting and weather situations.

In some examples, the said overlaid information can be further supplemented with information (e.g., as received from the data transmission unit 126) such as the material's status, magnitude, and chemical identity of the detected material with confidence level and geographical information or a combination thereof. The chemical identification process can iteratively correlate the spectral data with other information stored either remotely, e.g. in a database or in the cloud, or locally on the computing unit 112. Examples of other information are, available references from UV-VIS and IR spectroscopy data. To further enhance the identification of materials such as camouflage, chemical, biological, radiological, nuclear, explosive (CBRNE) in the user's field of view, machine learning can be used where an algorithm is trained with experimental data. Further, as may be contemplated, detected & segmented region with supplemental information in 2D, can be passed on to an augmented reality (AR) engine or application. Then the detected region can be overlaid with pixel highlights over the material, or an area where the material is or is expected to be present, in the field of view. Furthermore, an audible notification may also be issued in case of detection of any harmful substance or any life-threatening object in the body of a human in the field of view.

In some examples, the said overlaid information can be further supplemented with information (e.g., as received from the data transmission unit 126 or from the onboard memory) from IR fingerprint region obtained from an add-pn detection device and/or existing fingerprinting database.

The imaging device 100 of the present disclosure can see layers as one 2D layer after another in processing. For example, if something is hidden inside a shirt, the detected region can be highlighted over the shirt in the portable display 114, such as an AR glass or a mobile phone screen image. This alerts the user, something is wrong in some layer at that 2D location. The chemical identity of the object can reveal its hazardous nature and magnitude. This can be included as a threat level in supplemental information, for example for use as augmented information by the portable display 114. If at some instance, the imaging device 100 can't determine if the hazardous material is in between the shirt and the under-shirt, or all the way behind the under-shirt, then the general location can still be indicated. It may be understood that when passing messages or for legal regions to store the spectral data in a long-term storage medium. For real time threat assessment, the spectral data storage may be temporary or limited. For example, the analysis duration can be the retention time of the spectral data after which it is over written with a newer successive scene.

Examples of the present imaging device 100 can reduce or eliminate ambiguity while assessing a security situation, surveying in a difficult environment, patrolling or performing search and rescue missions. Human vision is not able to seeing a camouflaged object with a high degree of confidence in a crowded environment such as battlefield, concert area, sports arena, airports, processions, and protests. Human eyes are neither capable of distinguishing chemical, biological, radiological and nuclear (CBRN) materials present or planted in civilian, as well as in a battlefield setting. Hyperspectral medical imaging is useful because, among other things, it allows information about a subject to be obtained that is not readily visible to the naked eye. The imaging device 100 allow users to directly observe those objects and estimate their chemical identity and magnitude. This can help determine if they are hazardous, which aids situational awareness saving human lives. The imaging device 100 can be wearable, or it can be in, for example, a hand held device and therefore supplements human vision and diversifies its applicability. Fields of application for the imaging device 100 include; agriculture, pharmaceuticals, polymer sciences, material sciences, forensics, pathology, bio-medicine, ecological and geological studies, etc.

The imaging device 100 of the present disclosure can particularly be useful in military applications. For example, the imaging device 100 can be used to detect camouflaged object with a high degree of confidence in a battlefield or the like. Further, the imaging device 100 can be used for distinguishing chemical, biological, radiological and nuclear (CBRN) materials present or planted in civilian, as well as in a battlefield setting. The imaging device 100 can further be used for medical applications in an operational field. For example, the image of the foreign object, such as a shrapnel embedded in the soldier's body can be mapped in real-time and shown I augmented reality. Therefore, the present imaging device 100 would help other soldiers or field paramedic to provide immediate care to wounded soldier in the operational field or temporary camps where dedicated X-ray scanner or the like is not feasible. Additionally, band selective sensing of the imaging device 100 would allow soldiers to visualize toxic chemicals and other airborne hazards. The imaging device 100 being compact and portable, and further providing a hands-free operation being a head mounted device, allows soldiers to carry more supply and firearms rather than conventional bulky medical devices and toxin screening devices, thus potentially reducing the risk to soldier's life.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. A hybrid hyperspectral augmented reality device comprising:
    multi-level imaging sensors including at least two of the following:
        a long wave infrared sensor capable of detecting an object blocked from visual line of sight thereof,
        a hyperspectral imaging sensor capable of detecting chemical properties of the object, and
        a frequency modulated millimeter-wave imaging radar capable of long range spot scanning of the object,
    a wearable computing unit capable of co-registering data from the multi-level spectral imaging sensors and determining, based on said co-registered data, a threat type, threat level and geospatial location for the object,
    a portable display in electronic communication with the wearable computing unit and capable of displaying in augmented reality the determined threat levels for the object together in graphical association thereof, and
wherein the multi-level spectral imaging sensors include a tunable wavelength filter of between 0.35 to 2.6 μm.

2. The hybrid hyperspectral augmented reality device of claim 1, further comprising:
a camera to capture an image of the object,
wherein the computing unit is capable of spatially co-registering image from the camera with data from the multi-level spectral imaging sensors, and
wherein the portable display is capable of overlaying the threat data on the image from the camera.

3. The hybrid hyperspectral augmented reality device of claim 1, wherein the portable display projects or otherwise displays threat information to a user as without the use of overlaying information on an image taken from a camera.

4. The hybrid hyperspectral augmented reality device of claim 1, wherein the portable display is a head mounted display.

5. The hybrid hyperspectral augmented reality device of claim 4, further comprising a spatial tracking device located on the head mounted display to track at least the orientation of the head mounted display, and wherein the wearable computing unit is further arranged to co-locate the threat information and geospatial location information for an associated object with the field of view of the head mounted display.

6. The hybrid hyperspectral augmented reality device of claim 1, wherein the determination of threat type and level is self-contained within the wearable computing unit.

7. The hybrid hyperspectral augmented reality device of claim 1, wherein the tunable wavelength filter is arranged in front of a complementary metal-oxide semiconductor (CMOS) image sensor.

8. The hybrid hyperspectral augmented reality device of claim 1, wherein the tunable wavelength filter is arranged at the beam waist inside objective lens assemblies in front of a complementary metal-oxide semiconductor (CMOS) image sensor.

9. The hybrid hyperspectral augmented reality device of claim 1, wherein the computing unit is connected to the tunable wavelength filter and being capable of synchronizing a transmission wavelength from the tunable wavelength filter and a wavelength label on data from an associated multi-level spectral imaging sensor.

10. The hybrid hyperspectral augmented reality device of claim 1, wherein the tunable wavelength filter is a MEMS based device.

11. The hybrid hyperspectral augmented reality device of claim 10, wherein the two or more separate tunable wavelength filters have a different spectral range.

12. The hybrid hyperspectral augmented reality device of claim 10, wherein the two of more separate tunable wavelength filters have a partially overlapping spectral range.

13. The hybrid hyperspectral augmented reality device of claim 10, wherein one of the separate tunable wavelength filters has a range between 350-550 nm and the second of the separate tunable wavelength filters has a range between 500-1100 nm and/or 1100-1800 nm.

14. The hybrid hyperspectral augmented reality device of claim 10, wherein spectral imaging modules housing separate tunable wavelength filters are arranged in an array configuration eventually covers a range between 0.35 to 2.6.

15. The hybrid hyperspectral augmented reality device of claim 10, wherein long wave infrared imaging sensor and millimeter-wave imaging radar is arranged in array with the spectral imaging modules housing separate tunable wavelength filters.

16. The hybrid hyperspectral augmented reality device claim 1, wherein the multi-level spectral imaging sensors include a single lens capable of focusing an input light beam onto a beam splitting prism, said beam splitting prism capable of splitting the input light beam into two separate beams with each beam focused on a separate tunable wavelength filter placed in front of the CMOS image sensor.

17. The hybrid hyperspectral augmented reality device of claim 1, further comprising a data transmission means for sending sensor and/or determined threat data to a remote device.

18. The hybrid hyperspectral augmented reality device of claim 1, wherein said wearable computing unit is capable of retrieving and displaying additional information to a user based on the determined threat.

* * * * *